United States Patent [19]

Herrick

[11] 4,209,312

[45] Jun. 24, 1980

[54] CONTROLLING SIZE IN GLAUBER'S SALT CRYSTAL FORMATION

[75] Inventor: Carlyle S. Herrick, Alplaus, N.Y.

[73] Assignee: General Electric Company, Schenectady, N.Y.

[21] Appl. No.: 706,895

[22] Filed: Jul. 19, 1976

[51] Int. Cl.$^2$ .............................................. B01D 9/02
[52] U.S. Cl. ....................................... 62/4; 23/302 T; 252/71
[58] Field of Search .............. 62/4; 23/302 T, 302 R, 23/301 R; 423/551, 304-306; 122/21; 252/70, 71

[56] References Cited

U.S. PATENT DOCUMENTS

| | | | |
|---|---|---|---|
| 2,394,164 | 2/1946 | Gerhold | 252/71 |
| 2,592,139 | 4/1952 | Hegan | 23/302 |
| 2,677,243 | 5/1954 | Telkes | 62/4 |
| 2,677,664 | 5/1954 | Telkes | 252/70 |
| 2,827,438 | 3/1958 | Broadley | 23/302 |
| 2,856,506 | 10/1958 | Telkes | 23/302 |
| 3,400,249 | 9/1968 | Mekjean | 252/71 |

FOREIGN PATENT DOCUMENTS 47-32516 of 1972 Japan ....................................... 423/551

OTHER PUBLICATIONS

The Storage and Transfer of Low Potential Heat-Hodgins Canadian Jl. of Technology 33,.293 (1955).
Letter to the Editor-Whillier, The Sun at Work, vol. 2, p. 2, 6/57.
Solar Heat Storage-Telkes, ASME paper 64, WA-SO-L-9.

*Primary Examiner*—Hiram H. Bernstein
*Attorney, Agent, or Firm*—Leo I. MaLossi; James C. Davis, Jr.

[57] ABSTRACT

The formation of large crystals during the cooling and crystallization of Glauber's salt is prevented by the addition of ferric ions to the system.

3 Claims, No Drawings

CONTROLLING SIZE IN GLAUBER'S SALT CRYSTAL FORMATION

BACKGROUND OF THE INVENTION

The present invention is directed to the utilization of $Na_2SO_4 \cdot 10H_2O$ (Glauber's salt) as the liquid-solid phase change material in the storage of thermal energy.

The invention is particularly applicable to the utilization of Glauber's salt in a thermal energy storage device, which imparts interparticle motion to crystals in the system. Such a device is described in pending U.S. patent application Ser. No. 706,875 - Herrick, filed July 19, 1976, and assigned to the assignee of the instant invention. Therein a liquid-solid phase change material is sealed in a container, which is slowly rotated about a generally horizontal axis at a substantially constant rotational speed. The aforementioned application is incorporated by reference.

Much of the work that has been done in modifying the growth habit of various crystalline materials is set forth in the textbook "Crystal Growth" by H. E. Buckley [John Wiley & Sons, Inc., Third Printing (1956)] in Chapter 10 "Crystal Habit Modification by Impurities", pages 339-387. The statement is found therein beginning at the bottom of page 344 that "The use of iron as an impurity in the growth of large ammonium dihydrogen phosphate (ADP) crystals to stimulate prism growth is quite a common practice." It is also pointed out therein that the growth habit of ammonium sulfate can be changed to produce stouter crystals by the use of ferric ion and lowered pH. However, in contrast to earlier work in which the objective was to stimulate growth or produce larger crystals of Glauber's salt, the present invention has the goal of preventing the growth of large crystals.

In addition to the use of metal ions as impurities to affect crystal habit, a wide range of dyes and surfactants have been reported as having various effects in a number of crystallizing systems. A number of dyes and surfactants were employed as impurities in the rotating Glauber's salt system, but none had the desired effect of limiting crystal growth to small sizes.

DESCRIPTION OF THE INVENTION

The formation of large crystals during the cooling and crystallization of Glauber's salt in a system provided with interparticle motion is prevented by the addition of ferric ions.

The subject matter of the instant invention for which protection is sought is presented as claims at the conclusion of the written description of the invention set forth herein. The description sets forth the manner and process of making and using the invention and includes discussion of the best mode.

MANNER AND PROCESS OF MAKING AND USING THE INVENTION

Experience in the use of one embodiment of the heat exchange device described in the aforementioned Ser. No. 706,875 in which Glauber's salt is sealed in a cylinder, which cylinder is disposed horizontally and slowly rotated about its central axis has shown that during the cooling cycle anhydrous sodium sulfate ($Na_2SO_4$) particles become encapsulated in solid $Na_2SO_4 \cdot 10H_2O$. In order to complete the liquid-solid transformation the anhydrous sodium sulfate must diffuse through the encapsulating material and dissolve in the solution. This diffusion is accomplished more quickly, if the encapsulating walls are thin. By limiting the crystal growth to small sizes (e.g. ⅛" in diameter, or largest dimension), thin walls and short diffusion paths are assured.

These desired results are accomplished by replacing about 0.01 to 10% by weight of the Glauber's salt with a ferric compound soluble in an aqueous system. Whereas in an untreated system of Glauber's salt in a rolling cylinder heat storage apparatus crystals are commonly as large as ⅜ inch in diameter, the crystals in a system to which ferric ions have been added are usually no larger than about 1/16 inch in diameter. Systems treated in this way have successfully survived continuous freeze-thaw cycles without signs of degradation in reversability.

In the best mode contemplated ferric sulfate is employed and the quantity added is about ½ percent by weight of the Glauber's salt.

What I claim as new and desire to serve by Letters Patent of the United States is:

1. In the method of storing thermal energy in and retrieving thermal energy from a liquid-solid phase change material wherein said phase change material is maintained in a container and fluid is circulated over the outer surface of said container to effectuate the desired heat exchange, the improvement comprising the steps of:

employing sodium sulfate decahydrate as the solid form of the phase change material, introducing a quantity of additive material into said container soluble in water and releasing ferric ions into contact with said phase change material, said ferric ions being present in an amount effective to prevent the growth of sodium sulfate decahydrate crystals larger than about one-eighth inch in largest dimension and rotating said container at a pre-selected constant rotational speed about a generally horizontal axis to induce interparticle motion of crystals present in said phase change material.

2. The improved method of claim 1 wherein the quantity of additive material is in the range of 0.01 to 10 percent by weight of the phase change material.

3. The improved method of claim 1 wherein the additive material is ferric sulfate.

* * * * *